United States Patent [19]
Hanusiak et al.

[11] Patent Number: 5,763,079
[45] Date of Patent: Jun. 9, 1998

[54] WIRE PREFORMS FOR COMPOSITE MATERIAL MANUFACTURE AND METHODS OF MAKING

[75] Inventors: William M. Hanusiak; Lisa B. Hanusiak, both of Candia, N.H.; Jeffrey M. Parnell, Chelmsford, Mass.; Steven R. Spear; Charles R. Rowe, both of Derry, N.H.

[73] Assignee: Atlantic Research Corporation, Vienna, Va.

[21] Appl. No.: 447,584

[22] Filed: May 23, 1995

[51] Int. Cl.⁶ .................................................. D02G 3/00
[52] U.S. Cl. .................. 428/377; 428/379; 428/608; 428/627; 428/615; 428/698; 428/375; 156/188; 156/190; 242/117; 242/118
[58] Field of Search ........................ 428/545, 608, 428/615, 627, 698, 377, 379, 364, 357, 380, 375; 156/188, 190; 242/47, 118, 117

[56] References Cited

U.S. PATENT DOCUMENTS

| | | | |
|---|---|---|---|
| 3,209,533 | 10/1965 | Light | 60/35.6 |
| 3,371,488 | 3/1968 | Turner | 60/200 |
| 3,419,952 | 1/1969 | Carlson | 428/608 |
| 3,540,615 | 11/1970 | Stuckey et al. | 220/9 |
| 3,573,123 | 3/1971 | Siegel et al. | 156/190 |
| 3,900,150 | 8/1975 | Delgrosso et al. | 428/608 |
| 4,041,869 | 8/1977 | Miguel | 102/56 |
| 4,458,482 | 7/1984 | Vetter et al. | 60/253 |
| 4,478,151 | 10/1984 | Vetter et al. | 102/481 |
| 4,982,870 | 1/1991 | Van Loon | 220/414 |
| 5,170,007 | 12/1992 | Figge, Sr. | 102/481 |
| 5,460,774 | 10/1995 | Bachelet | 419/5 |

*Primary Examiner*—Patrick Ryan
*Assistant Examiner*—J. M. Gray
*Attorney, Agent, or Firm*—Lowe, Price, LeBlanc & Becker

[57] ABSTRACT

A manufacturing method of combining wires and fibers to fabricate fiber reinforced composites is disclosed. The fibers are drum wound on an adhesive-coated substrate followed by coating with a barrier layer to preserve the fiber spacing. A layer of the adhesive material is then applied to the fiber wrap and wire is wound therearound. A series of increasingly viscous tacky materials can then be applied to the wire wraps so that all gaps between the wires are filled. The inventive method can be used to form standard wire/fiber preforms, variable spacing wire/fiber preforms, ring preforms and wire only preforms which can be processed into fiber reinforced composite materials.

46 Claims, 4 Drawing Sheets

STANDARD CIRCULAR WIRE

Figure 3a

'+' SHAPED WIRE

Figure 3b

ROUNDED '+' WIRE

WIRE PREFORMS FOR COMPOSITE MATERIAL MANUFACTURE AND METHODS OF MAKING

FIELD OF THE INVENTION

The present invention is directed to a wire preform for composite material manufacture and, in particular, a wire preform which utilizes layers of fibers and wires using mutually insoluble adhesive and coating materials to preserve fiber or wire spacing.

BACKGROUND ART

The use of wire preforms or prepegs in the manufacture of composite materials is well known in the art. In these types of preforms, wire material is incorporated with or without other materials such as matrix materials or strengthening elements in a form for subsequent processing into composite materials.

U.S. Pat. No. 4,697,324 to Grant et al. discloses filamentary reinforced composite rings and methods of making. Wire-like material such as ribbons of a desired matrix alloy are cowound with filament materials in spiral monolayers. The monolayers are stacked on top of one another and consolidated to form a ring-shaped composite member.

U.S. Pat. No. 4,782,992 to Doble discloses another method of forming a composite article using a continuous, woven, flat, helical tape of filaments and a continuous, flat, helical tape of foil. The two helical tapes are interleaved to form a helical assembly having turns of filaments alternating with turns of foil. The two helical tapes are subjected to deformation forces to form a composite ring structure.

One of the drawbacks of these prior art processes is maintaining the desired spacing relationship between the reinforcing materials and matrix materials. Changing fiber spacing can result in undesirable voids in the manufactured composite component. Prior art processes also do not provide adequate control over mass per unit area for composite materials. Voids can also occur during spiral winding of reinforcing materials such as fibers or the like. In addition, this type of spiral winding causes radial movement of the fibers which can result in fiber breakage during the winding process.

In view of the deficiencies in the prior art as discussed above, a need has developed to provide an improved method for making composite material preforms using wires and fibers which permits precise control of the preform mass per unit area variable, is low in cost and produces a high density preform for subsequent composite material manufacture.

In response to this need, the present invention provides a manufacturing method which uses wires, and optionally fibers, to fabricate composite materials. The inventive method places wires and fibers together in a specific arrangement which can then be maintained during subsequent consolidation. The inventive method is also low in cost, easily repeatable and produces a high density wire preform for subsequent composite material manufacture.

SUMMARY OF THE INVENTION

Accordingly, it is a first object of the present invention to provide a new and improved method of making wire preforms for composite material manufacture and products therefrom.

Another object of the present invention is to provide a preform manufacturing method which produces a high density preform that maintains its fiber/wire arrangement during subsequent processing.

A still further object of the present invention is to provide preforms containing matrix and strengthening materials which are held in place during subsequent processing such as curing, off gassing or the like.

A further object of the present invention is to provide a method for making filamentary wound components wherein fibers and wires are arranged in a layered relationship and subsequently wound together as a preform for processing into fiber reinforced rings or disks.

Other objects and advantages of the present invention will become apparent as a description thereof proceeds.

In satisfaction of the foregoing objects and advantages, the present invention, in its broadest embodiment, discloses a wire preform for composite material manufacture comprising a substrate, an adhesive on the substrate, a plurality of wires laid on the adhesive and a barrier layer applied over the plurality of wires. The barrier layer and adhesive are mutually insoluble so that the barrier layer does not adversely affect the adhesion between the substrate and wires applied thereto.

In a preferred embodiment, the adhesive is polyisobutylene in a hexane solvent and the barrier layer is polymethylmethacrylate in an acetone solvent. The wire material is preferably a titanium or titanium alloy and the fiber material is preferably silicon carbide.

Alternatively, a wire preform is provided which utilizes both fibers and wires as part of the preform. In this embodiment, a plurality of fibers are first supplied to the adhesive-coated substrate followed by barrier layer application. A second layer of the adhesive is applied to the first barrier layer followed by application of a plurality of wires thereto. Another barrier layer is then applied to the plurality of wires. In this embodiment, the adhesive and barrier layers are again mutually insoluble. The wire preform of this embodiment may include additional layers of fibers and wires applied as described above.

Either of the wire preforms disclosed above can be stacked for use in fabrication of fiber reinforced composite materials.

In another aspect of the invention, the wire materials can have various cross-sectional shapes to minimize void content in the preform. For example, the wires may be cross-shaped in cross section with either sharply angled recesses in the wire surface or curved recesses. The spacing of the fibers and/or wires may also be altered when manufacturing preforms for use in tubular or cylindrical structures.

According to one embodiment of the inventive method, the wire preform is made by the steps of providing a substrate and applying an adhesive thereto. A plurality of wires are applied to the adhesive followed by applying a barrier layer to the applied wires. A second layer of the adhesive is then applied to the barrier layer, the adhesive and barrier layer being mutually insoluble. In this embodiment, the wire preform is preferably used as a monolithic coating.

In an alternative mode, the preform is made combining a plurality of fibers and wires in stacked relationship. Following adhesive application on the substrate, a plurality of fibers are applied thereto in a spaced apart relationship. The barrier layer is then applied over the fibers followed by another application of the adhesive over the barrier layer. A plurality of wires in spaced apart relationship are then applied to the adhesive layer covering the barrier layer. Again, the adhesive and barrier layers are mutually insoluble as described above. In this method, the wire can have a cross-sectional shape with recesses for receiving adjacent fibers, the recesses being either angled or curved in shape. The fibers can be uniformly spaced apart or have increasing inter-fiber spacing for successive fiber layers, particularly when the preform is to be used in a cylindrical or tubular construction.

Preferably, the wires and fibers are applied using a drum winding technique. The wire preforms can be stacked together with or without the substrate material for subsequent composite material manufacture.

In yet a further aspect of the invention, a method and apparatus is provided for fabricating filamentary wound components having continuous fibers from the inside diameter to the outside diameter of the wound structure. In this embodiment, a wire/fiber preform is made by the steps of providing a plurality of fiber-containing bobbins and wire-containing bobbins. The fibers and wires are drawn off the respective bobbins and wound on a mandrel-containing rotating drum such that a layer arrangement is formed on the mandrel, the layer arrangement comprising a planar layer of fibers adjacent a planar layer of wires. The wires and fibers are first attached to the mandrel using an adhesive before the winding step. Each of the fibers and wires are wound on the mandrel with the respective fiber and wire axis being maintained generally perpendicular to the winding surface of the drum so that the fibers and wire are not spirally wound.

Preferably, ceramic guides are utilized to guide the fibers and wires into the planar layers and further into layered arrangements for drum winding. The wires can have the cross-sectional shapes described above for improved nesting with adjacent fibers.

BRIEF DESCRIPTION OF THE DRAWINGS

Reference is now made to the drawings of the invention wherein.

DESCRIPTION OF THE PREFERRED EMBODIMENTS

The inventive method and apparatus of making wire and wire/fiber preforms for the manufacture of composite materials represents a significant advance over known prior art techniques which are costly, require complex equipment and fail to provide a high quality preform having the desired strengthening component distribution and proper ratios between matrix materials and strengthening components.

According to the invention, in its broadest embodiment, a substrate is coated with an adhesive. A wire composite material component is then applied to the adhesive-coated substrate. A barrier layer is applied over the composite material, the barrier layer being mutually insoluble with the adhesive on the substrate. Mutual insolubility is intended to mean that none of the components e.g. the polymer or solvent, of the adhesive are soluble in the barrier layer components, e.g. its solvent or polymer and vice versa.

With the mutual insolubility between the adhesive and the barrier layer, the wire composite material component applied to the adhesive remains in place during subsequently preform curing and/or other processing. That is, none of the barrier layer components break down the adhesion and cause wire misalignment. Consequently, the orientation and positioning of a desired composite material component is unaffected in subsequent layering sequences or other composite manufacture-related processing steps.

If desired, the barrier coating applied to the wire composite material components is again coated with the adhesive followed by subsequent layering of wires and barrier layers. In this embodiment, the wire preforms are preferably used as a monolithic coating material in the fabrication of fiber reinforced composites using wire/fiber preforms.

The wire can be any alloy, size and shape. Preferably, the alloy of the wire is the matrix alloy of the composite being fabricated, e.g. titanium or a titanium alloy.

In a more preferred embodiment, the wire composite material component is combined with a fiber component to make a wire/fiber preform. In this embodiment, fibers, e.g. strengthening material such as silicon carbide, are positioned in a spaced apart relationship on the adhesive-coated substrate. Once the adhesive is dry, the applied fibers are then coated with the barrier material followed by another coating of the adhesive layer which acts as a base for a subsequent layer of wire material thereon. The wire material can then be coated with the barrier layer to form the wire/fiber preform. Additional layers of the fibers and wires can be applied thereon as described above.

The fiber material can be any type typically used as a strengthening element in fiber reinforced composite materials. Exemplary of these fibers are carbon, kevlar, boron, silicon carbide, silicon nitride, aluminum or the like. Preferably, silicon carbide fibers are utilized.

The substrate receiving the adhesive can be any type which is adaptable to receive the adhesive. The substrate should be chemically inert to any solvents used in subsequent preform processing and provide a smooth-defect-free surface will not cause perturbations in the material laid thereon such as the spaced apart fibers. The substrate can be a sheet or strip material such as aluminum foil or a polyethylene or teflon tape.

The adhesive material used to secure the wires or fibers to the substrate material should have characteristics such as minimal shrinkage during drying to maintain the wire or fiber spacing, insolubility with any other solvent used in subsequent processing, sufficient adherence to the substrate to allow the preforms to be handled in a manufacturing environment, sufficient adhesive removability to allow removal of the backing or substrate material after preform manufacture and the ability to be completely off-gassed. A preferred tacking adhesive is polyisobutylene dissolved in hexane at 1% by weight of the polymer. However, other known adhesives following the criteria given above and providing the desirable tacking can be utilized in the instant invention.

The dimensions of the wire and fiber components can be any suitable for composite material manufacture. Fibers can be any diameter and length and, when used in conjunction with the wire material, may be wound at any spacing so long as the selected wires are properly nested therebetween. Preferably, silicon carbide fibers are utilized having a 0.005" diameter. Typically, the wires are 0.007" in diameter.

The inventive wire and wire/fiber preforms and method of manufacture can be used in any known processes and apparatus for composite material manufacture. Exemplary of these types of processes include diffusion bonding, liquid metal infiltration, powder metallurgy processing techniques such as hot isostatic pressing or the like. Since these techniques are well known in the art, a further detailed description thereof is not deemed necessary for understanding of the invention.

The inventive method, through the selection of various variables associated with the fiber and wire composite material components, permits precise control of the mass loading when a given preform is made. That is, the size of the wire and/or fiber can be chosen so that a desired fiber volume fraction is achieved. The size and shape of the wire can also determine the green density of the composite as will be described in greater detail hereinbelow.

When making the wire/fiber preform, the spacing between the fibers can be altered to accommodate the geometry of the composite material being fabricated. For example, if the preforms are to be wrapped around a tubular or cylindrical form for subsequent processing, the spacing between the fibers can be increased for successive layers due to their ever increasing radial length when wrapped or rolled into a cylindrical configuration.

The barrier layer coating which is applied over the wires and fibers must meet the similar requirements as stated above for the adhesive. That is, the barrier coating must have minimal shrinkage during drying to maintain fiber and/or wire spacing, be insoluble in any solvent used in subsequent processing and be able to be completely off-gassed. In a preferred embodiment, the material for the barrier layer is polymethylmethacrylate (PPMA) which has been dissolved in acetone at 1% by weight of the polymer.

Figure 1:
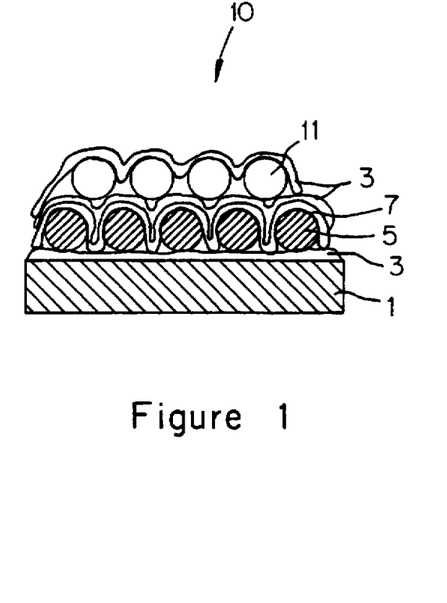
FIG. 1 is a cross-sectional view of an exemplary wire/fiber preform according to the invention.

With reference now to FIG. 1, a first embodiment of the invention is generally designated by the reference numeral 10 and seen to include a substrate 1, adhesive layer 3 and spaced apart fibers 5 attached thereto. The fibers 5 are laid on the adhesive 3 in a spaced-apart relationship.

The substrate 1 is chemically inert to any solvent used in subsequent processing and must also provide a smooth, defect free surface that will not cause perturbations in the fiber spacing when applied thereto. Preferably, the substrate is a 0.003" thick layer of 0 tempered type AA1100 series aluminum foil.

Once the fibers 5 are applied to the substrate, a barrier layer 7 is applied over the spaced apart fibers 5. The adhesive 3 is then applied over the barrier layer 7 followed by application of a layer of wires 11 and another adhesive layer 3. The completed preform can then be stacked up for use in the fabrication of fiber reinforced composite materials. It should be understood that the stacking of the preforms can be done with or without the substrate 1.

Figure 2:
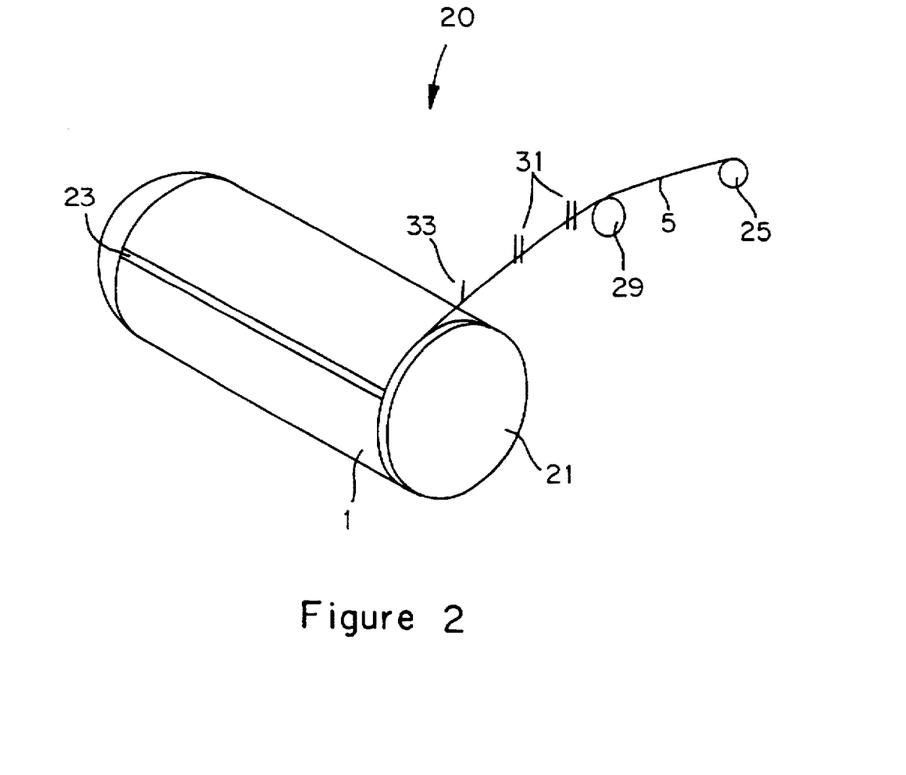
FIG. 2 is a schematic representation of an exemplary method of making the inventive preform.

Although any known techniques can be used to apply the wires and/or other composite material components to a given adhesive-containing substrate, it is preferred to utilize a drum winding process. With reference now to FIG. 2, a schematic drum winding apparatus is generally designated by the reference numeral 20. The apparatus 20 includes a drum 21 which has been cleaned so that there is no dirt, powder, etc. on the drum surface that would become a bump under the substrate 1 and thereby cause a fiber spacing disturbance. One surface of the substrate 1 is also cleaned and the substrate is wrapped around the drum with the clean side facing the drum. The substrate can be adhered to the drum in any known fashion such as using an adhesive or the like.

The substrate 1 is wrapped on the drum leaving a gap 23, preferably about ¼" in width. The gap 23, preferably located at the same location on the drum, facilitates removal of the preform material.

Once the substrate 1 is applied to the drum 21, the substrate is smoothed and the outer surface is cleaned. During this cleaning, the drum operator presses down hard against the substrate so that any inclusions, bumps, etc. are defined. The bumps are then scraped with a razor blade to smooth them out.

The polyisobutylene-hexane adhesive mix is applied to the substrate with a foam brush while the drum is rotating. A sufficient quantity of the polyisobutylene-hexane mix should be applied, preferably in multiple coats, so that the wire or fiber will not shift on the substrate during drum winding. The coats should be allowed to dry completely before the next one is applied. The coats also cannot have any bubbles, drips, brush strokes or any other defects which may cause fiber spacing perturbations.

Still with reference to FIG. 2, the apparatus 20 includes a fiber spool 25, the fiber spool holding the fiber 5 to be wrapped around the drum. The fiber 5 is fed through a tensioning wheel 29 and aligners 31. The fiber is then taped to the substrate near one edge of the drum. The aligner tip 33 is positioned next to the fiber and the drum winding is instituted. When the fiber is wound around the drum in a desired width, the winding process is stopped. The fiber is preferably wound first because, for a given tension, the fiber has a lower strain value than the wire and to obtain a mat or preform with no defects, the higher strength material must be on the outside. When the mat is as wide as required, the winding is stopped and the end of the fiber is taped onto the substrate. The fiber is then sprayed with the barrier coating, preferably 1% by weight of PMMA in an acetone solvent.

With reference to FIGS. 1 and 2, once the fiber 5 is spiral wound around the drum and coated with the barrier layer 7, the tacky adhesive 3, preferably two coats, is then applied to the fiber mat to provide a tacky surface on which to wind the wires. The drum winder traverse mechanism which includes the aligners 31 and aligner tip 33 must be returned to the start of the wrap so that the wire can be wound in the same direction as the fiber. The wire 11 should not be wound in the opposite direction as it will not lay in the groove created by the adjacent fibers. A wire spool is installed in the drum winder in place of the fiber spool and the wire is fed through the winder and taped to the drum in same manner as the fiber. The wire is then wound at the same drum winder settings as the fiber and is taped down when the mat is as wide as necessary.

Figure 3A:
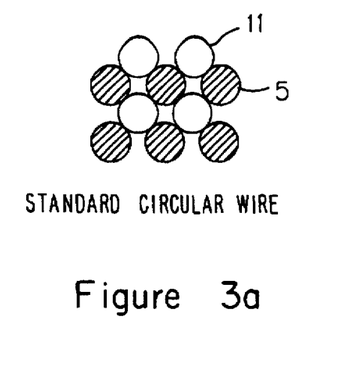
FIGS. 3a-3c are cross-sectional views of three different configurations of fiber/wire arrangements of the inventive preforms.
Figure 3B:
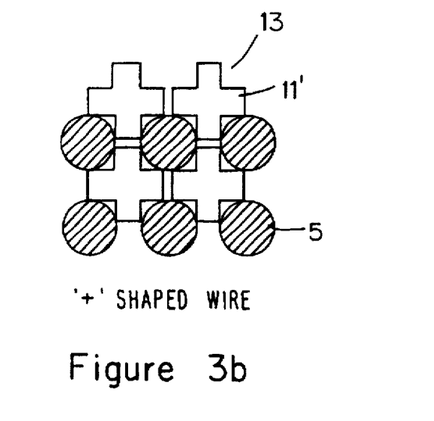
Figure 3C:
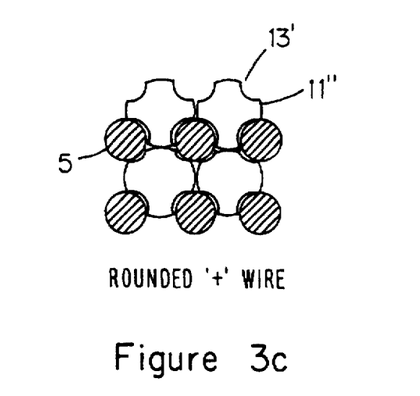

With reference to FIGS. 3a–3c, the wire 11 can have a circular cross section or a cross-shaped cross sectional shape 11' as shown in FIGS. 3b and 3c. In FIG. 3b, the cross-shaped wire 11' forms recesses 13 which are right-angled in shape and which extend longitudinally along the wire outer surface.

Similarly, referring to FIG. 3c, the wire 11" has arcuate recesses 13'.

Since the size and shape of the wire determine the green density of a given composite, the green density being the ratio of solids (fiber and wire) to the total volume in the composite preform, the wire shapes 11' and 11" provide increased density. This increased density improves the ability to fabricate certain components. Preferably, the circular wire or wire shapes 11' and 11" have a 0.007" diameter or cross-sectional width.

In FIG. 3a, the circular wire 11 provide a green density of about 80%. In contrast, FIGS. 3b and 3c provide green densities of 90 and 98%, respectively.

With reference again to FIG. 1, the wire wrap 11 is then coated with the tacky adhesive 3 in the following manner. First, a layer of solvent is applied to the wires 11. This solvent layer partially dissolves the tacky adhesive 3 arranged between the fibers and wires. Again, the solvent is preferably hexane. Following this initial solvent layer application, three layers of increasing viscous tacky adhesive coatings are made. The first two of the three tacky adhesive coatings should be less viscous mixes than the tacky material used to coat the fibers 5, the thinnest mix applied first. In this embodiment, the first tacky adhesive coating uses a 0.1% polyisobutylene/hexane mix followed by a 0.75% polyisobutylene/hexane mix. The coats of each of these two layers are applied before the final tacky adhesive layer application. The final layer can be any material that meets the tacky adhesive material requirements specified above. Again, a 1% polyisobutylene/hexane mix is preferred.

Once the final tacky adhesive material layer 3 is applied, the completed preform can be removed from the drum and stacked up for use in known fabrication techniques of fiber reinforced composite materials.

Figure 4:
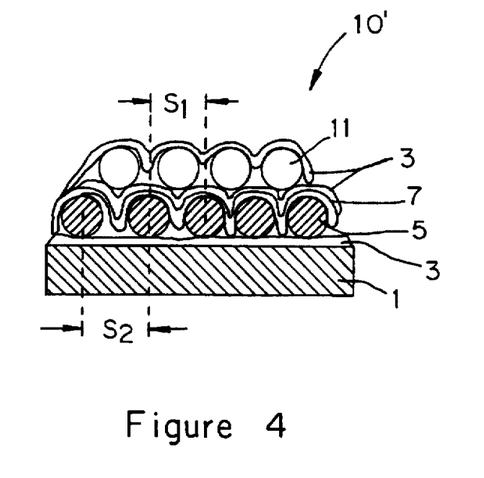
FIG. 4 is a cross-sectional view of another embodiment of the inventive preform.

FIG. 4 shows an alternative preform 10' having, in order, the substrate 1, tacky adhesive 3, fibers 5, barrier layer 7, tacky adhesive 3, wires 11 and tacky adhesive 3 which utilizes a graduated fiber spacing. That is, the fibers are wound around the adhesive-coated substrate 1 with center line spacings S1. The traverse speed and/or drum rotation is then changed such that the fiber spacing is increased to a center line spacing represented by $S_2$. The $S_2$ spacing can then be continued for a desired preform width until another spacing is desired. The traverse speed and/or drum rotation would then be changed again to achieve a smaller or larger spacing as desired. It should be understood that the fabrication process of the preform 10' is identical to that described above for the preform 10 except for the graduated fiber spacing described above.

Figure 5:
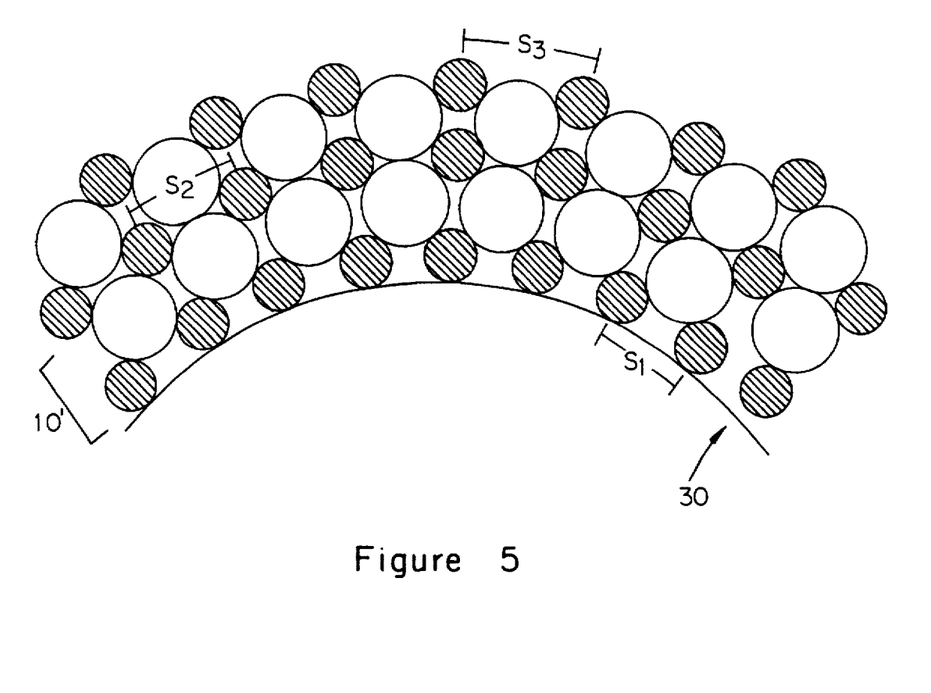
FIG. 5 is a cross-sectional view of the preform of FIG. 4 in multiple layers and varying fiber spacing.

The preform 10' is ideal for use in axially reinforced tubular structures. During fabrication of these structures, the preforms 10' can be rolled up with each succeeding layer or ply meshing with the previous one. This meshing is best depicted in FIG. 5 wherein a series of preforms 10' are rolled on a cylindrical form 30. As a result of the rolling or stacking of preforms 10' on the cylinder and the increasing radial distance from the core axis (increasing circumferential ply length), the spacing of the fibers and wires must increase for each successive preform applied to achieve the desired nesting. The fibers adjacent the form 30 require a spacing represented by $S_1$. The next ply of fibers requires a greater spacing $S_2$ as a result of the increasing circumferential length of subsequently applied preforms. Likewise, the next fiber layer requires a more increased spacing $S_3$. Knowing the geometry of the component to be fabricated, the fiber spacing during preform manufacture, see FIG. 4, can be adjusted so that each preform layer of FIG. 5 has increasing fiber spacing to accommodate the ever increasing circumferential distance of the applied preform layers.

It should be understood that the barrier layer and adhesives are not shown in FIG. 5 for clarification purposes.

Figure 6:
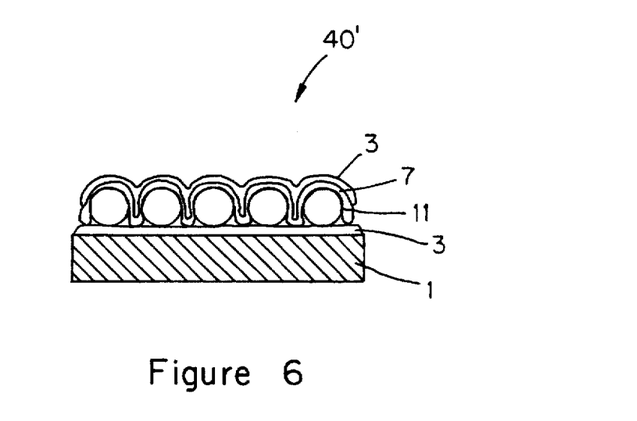
FIG. 6 is cross-sectional view of another embodiment of the inventive preform using only wire materials.

FIG. 6 shows an alternative preform 40' which comprises only wires. The wire preform 40' is manufactured similarly to the embodiments described in FIGS. 1 and 2 except for the lack of the fibers 5. The wire 11 is wound directly onto the adhesive-coated substrate 1 and sprayed with the barrier coating 7. Another adhesive layer 3 is applied thereto. The preform 40' is preferably used as a monolithic material or coating in the fabrication of fiber reinforced composites utilizing the wire/fiber preforms described above.

Although varying numbers of layers of the adhesive and barrier coating materials are disclosed, it should be understood that the number of layers can vary depending on the type of wire, fiber or composite material geometry desired. That is, one or more of the barrier and adhesive coatings may be required during the application steps provided above. Moreover the viscosity may also be adjusted by adjustment of the solvent percentage in either of these coating materials.

The preforms described above are particularly suited for titanium matrix composites wherein the wire material is a titanium or titanium alloy and the fiber material is silicon carbide. Alternatively, the wires could be alloys of titanium and other elements such as aluminum or can be combinations of different metals or alloys such as titanium and aluminum wires.

Figures 7, 7A, 8:
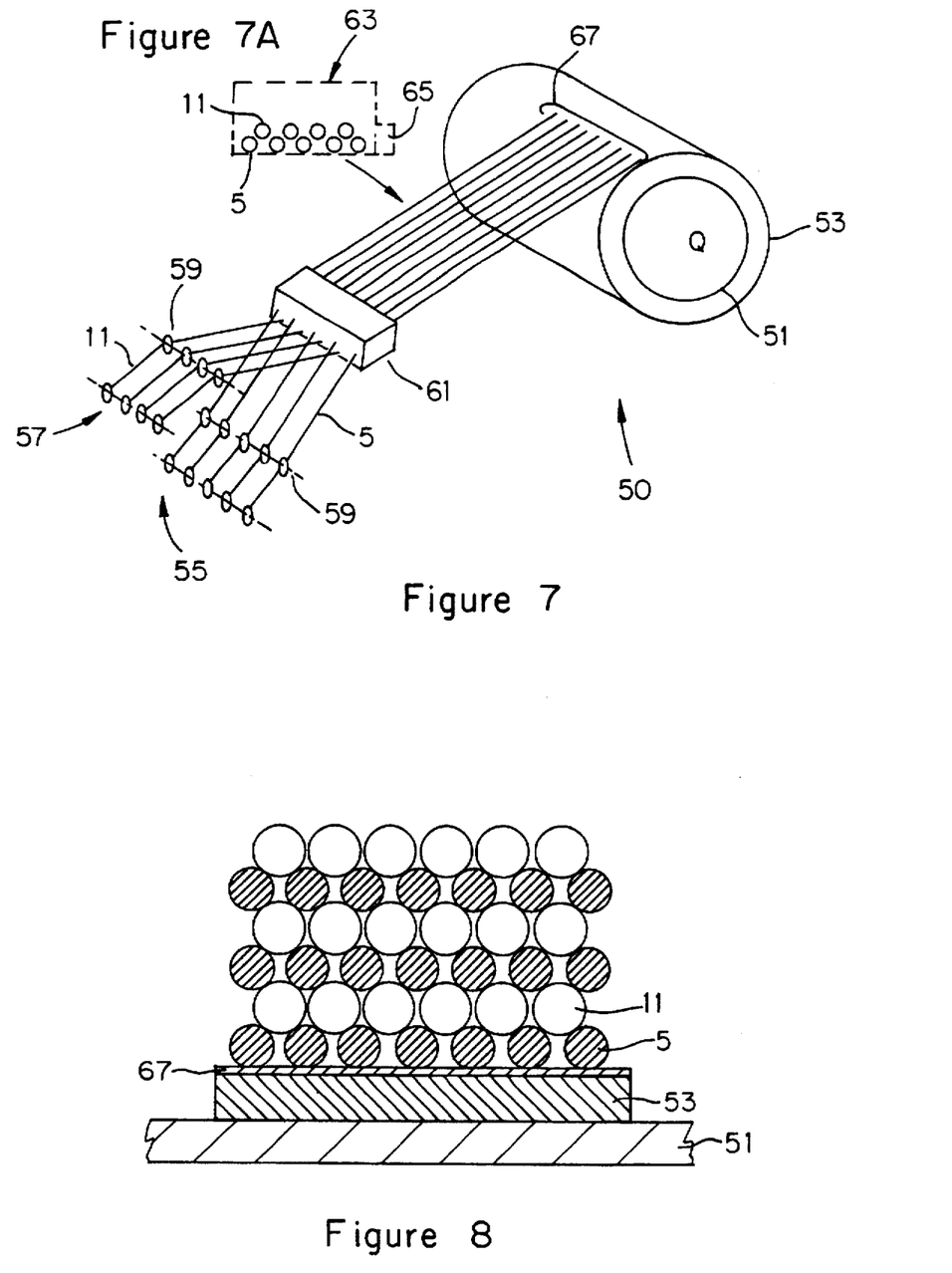
FIGS. 7 and 7A are a schematic representation of an inventive creel system for fabricating filamentary wound components.
FIG. 8 is a cross-sectional view of a portion of the mandrel-wound filamentary components of FIG. 7.

In another aspect of the invention, with reference to FIGS. 7 and 8, a novel method and apparatus are disclosed to fabricate filamentary wound components in which the wound fibers and wires are continuous from the inside diameter to the outside diameter of the as wound structure. With reference now to FIG. 7, a creel system is generally designated by the reference numeral 50. The creel system 50 has the ability to wind fibers and wires so that the axes of the wires and fibers are maintained generally perpendicular to the winding surface. This contrasts with the prior art technique of spiral winding of fibers and wires as shown in FIG. 2 which can cause the fibers to break.

The creel system 50 includes a drum 51 having a mandrel 53 therearound. A series of fiber bobbins 55 are provided, one bobbin for each fiber in a given fiber layer. Likewise, a series of wire bobbins 57 are also provided, each wire bobbin corresponding to a given wire in a layer. Guides 59 direct the fibers 5 and wires 11 into the meshing guide 61 for drum winding. It should be understood that the bobbins 55 and 57 are shown in an exaggerated spacing for clarity purposes only. Any number of bobbins 55 and 57 can be utilized in both a width orientation and a vertical orientation depending on the preform desired width and number of layers to be wound on the mandrel.

Reference numeral 63 represents an enlarged cross-sectional view taken across the wire/fibers meshed by the guide 61. The wires 11 are nested between the fibers 5 and are wrapped around the mandrel 53 in this stacked arrangement designated by the reference numeral 65. As stated above, the stacked arrangement 65 can comprise a single layer of the fibers 5 and wires 11 or multiple layers thereof. When using multiple layers, a multiplicity of bobbins 55 and 57 are stacked in a vertical orientation.

Prior to initiation of winding, each of the bobbins 55 and 57 should contain enough fiber or wire to complete the entire wound component, otherwise splicing would be required which could cause fiber spacing perturbations. The number of spools and the length of material required are determined by the part shape and the desired axially and radially fiber spacing. Further, the wires 11 can vary in size, shape and alloy make up as described above.

Prior to winding, the fibers and wires are fed through the guides 59 and 61 and attached to the mandrel 53. The fibers and wires can be attached at one location on the mandrel but are preferably attached at separate points. The attachment to the mandrel can be made with any material which is sufficiently strong to allow the mandrel to rotate without loosening of the fibers and wires and can be completely off gassed. Preferably, the attachment is made through the application of a cyano-acrylate glue as represented by reference numeral 67.

Once the wires 11 and fibers 5 are attached using the adhesive 67, the mandrel 53 is rotated and the fibers and wires are wound up until as many layers as required are formed. A cross section of an exemplary ring structure formed by fiber/wire winding is shown in FIG. 8. As is evident from FIG. 8, the wires 11 fall into the grooves created by adjacent fibers 5. After winding is complete, the fibers and wires are attached using the same adhesive 67. Any excess wire or fiber is then severed from the preform. The mandrel 53 is then removed from the drum 51 for subsequent processing into a fiber reinforced ring or disk.

By winding the wires and fibers in a stacked arrangement, the winding axis of each fiber and wire remaining generally constant during winding, i.e. no radial wire or fiber movement. Thus, less breakage occurs particularly for the fibers, and an improved preform is made.

As such, an invention has been disclosed in terms of preferred embodiment thereof which fulfill each and every one of the objects of the present invention as set forth hereinabove above and provides a new and improved wire preform for composite material manufacture and methods and apparatus for manufacture thereof.

Of course, various changes, modifications and alterations from the teachings of the present invention may be contemplated by those skilled in the art without departing from the intended spirit and scope thereof. Accordingly, it is intended that the present invention only be limited by the terms of the appended claims.

We claim:

1. A method for making a wire preform for composite material manufacture comprising the steps of:
   a) providing a substrate;
   b) applying a first adhesive layer to said substrate;
   c) applying a plurality of wires to said first adhesive layer so that each wire laid on said first adhesive layer is in a longitudinal direction with respect to a width of said substrate;
   d) applying a barrier layer distinct from said wires onto said wires; and
   e) applying at least a second adhesive layer distinct from said wires to said barrier layer;
   f) wherein at least said second layer adhesive and said barrier layer are mutually insoluble.

2. The method of claim 1 wherein said wire preform is used as a monolithic coating for composite materials.

3. A method of making a wire preform for composite material manufacture comprising the steps of:
   a) providing a substrate;
   b) applying a first adhesive layer to said substrate;
   c) applying a plurality of fibers to said first adhesive layer in spaced apart relationships;
   d) applying a barrier layer distinct from said fibers onto said fibers;
   e) applying a second layer of adhesive to said barrier layer;
   f) applying a plurality of wires in spaced apart relationships on said second adhesive layer covering said barrier layer; and
   g) applying a third adhesive layer over said plurality of wires;
   h) wherein at least said second adhesive layer and said barrier layer are mutually insoluble.

4. The method of claim 3 wherein said adhesive uses hexane as a solvent and said barrier layer uses acetone as a solvent.

5. The method of claim 3 wherein said adhesive includes polyisobutylene and said barrier layer includes polymethylmethacrylate.

6. The method of claim 3 wherein said wire is titanium or an alloy thereof.

7. The method of claim 3 wherein said wire has a cross sectional shape having recesses for receiving adjacent fibers.

8. The method of claim 7 wherein said recesses have one of an angled shape or a curved shape.

9. The method of claim 8 wherein said curved shape recesses are sized to correspond to a curved shape of said fibers.

10. The method of claim 3 wherein said fibers are uniformly spaced apart.

11. The method of claim 3 further comprising the steps of adjusting the spaced apart relationships of said fibers when applied to said substrate such that when said preform is wound around a mandrel to form a plurality of alternating fiber and wire layers, a distance between adjacent fibers increases for successive fiber layers wound around said mandrel.

12. The method of claim 3 wherein said substrate is applied to a drum and said fibers and said wire are wound therearound.

13. The method of claim 3 wherein a plurality of preforms are made and stacked together for subsequent composite material manufacture.

14. A wire preform for composite material manufacture comprising:
   a) a substrate;
   b) an adhesive layer on said substrate;
   c) a plurality of wires, each wire laid on said adhesive layer in a longitudinal direction with respect to a width of said substrate;
   d) a barrier layer distinct from said wires applied over said plurality of wires; and
   e) another adhesive layer formed over said barrier layer;
   f) wherein said barrier layer and each said adhesive layer are mutually insoluble.

15. The wire preform of claim 14 wherein each said adhesive layer includes hexane as a solvent and said barrier layer includes acetone as a solvent.

16. The wire preform of claim 14 wherein each said adhesive layer includes polyisobutylene.

17. The wire preform of claim 14 wherein said barrier layer includes polymethylmethacrylate.

18. The wire preform of claim 14 wherein each said adhesive layer is 1.0% by weight of polyisobutylene in hexane and said barrier layer is 1.0% by weight of polymethylmethacrylate in acetone.

19. The wire preform of claim 14 wherein said wire is titanium or a titanium alloy.

20. A wire preform for composite material manufacture comprising:
   a) a substrate;
   b) a first layer of an adhesive on said substrate;
   c) a plurality of fibers applied to said first layer in spaced apart relationships;

11 d) a barrier layer distinct from said fibers applied over said fibers;

e) a second layer of said adhesive applied to said barrier layer;

f) a plurality of wires applied to said second adhesive layer, each wire aligned with an adjacent fiber so that one wire nests between a pair of fibers disposed underneath said one wire; and g) a third layer of said adhesive applied to said plurality of wires;

h) wherein said adhesive and said barrier layer are mutually insoluble.

21. The wire preform of claim 20 wherein said adhesive includes hexane as a solvent and said barrier layer includes acetone as a solvent.

22. The wire preform of claim 20 wherein said adhesive includes polyisobutylene.

23. The wire preform of claim 20 wherein said barrier layer includes polymethylmethacrylate.

24. The wire preform of claim 20 wherein said adhesive is 1.0% by weight of polyisobutylene in hexane and said barrier layer is 1.0% by weight of polymethylmethacrylate in acetone.

25. The wire preform of claim 20 wherein said wire is titanium or a titanium alloy.

26. The wire preform of claim 20 wherein said fibers are silicon carbide.

27. The wire preform of claim 20 wherein said fibers are uniformly spaced apart.

28. The wire preform of claim 20 wherein said fibers are non-uniformly spaced apart such that when said preform is wound around a mandrel to form a plurality of alternating fiber and wire layers, a distance between adjacent fibers increases for successive fiber layers wound around said mandrel.

29. The wire preform of claim 20 wherein said wire has a cross sectional shape having recesses for receiving adjacent fibers.

30. The wire preform of claim 29 wherein said recesses have one of an angled shape or a curved shape.

31. The wire preform of claim 30 wherein said curved shape recesses are sized to correspond to a curved shape of said fibers.

32. A method of making a wire fiber preform for composite material manufacture comprising the steps of:

a) providing a plurality of fiber-containing bobbins;

b) providing a plurality of wire-containing bobbins;

c) providing a mandrel-containing rotating drum;

d) drawing off said fibers and said wires in a layered arrangement comprising at least one planar layer of fibers adjacent a planar layer of wires wherein the wires of the first planar layer and the fibers of the second planar layer are both in side-by-side relationship;

e) attaching an end of said layer arrangement to said mandrel;

f) winding said layered arrangement on said mandrel;

g) attaching the other end of said layer arrangement to said wound layer arrangement; and h) removing said mandrel from said drum;

i) wherein said first planar layer of wires and said second planar are arranged on said mandrel in an adjacent stacked relationship, said adjacent layers of fibers and wires being nested together, axes of said wires and fibers being generally perpendicular to a surface of said mandrel.

33. The method of claim 32 wherein said layer arrangement comprises a plurality of alternating planar layers of fibers and wires.

34. The method of claim 32 wherein said layer arrangement is wound in multiple turns on said mandrel drum prior to attaching said other end to form a multiply layered arrangement.

35. The method of claim 32 wherein an adhesive is used for said attaching step.

36. The method of claim 35 wherein said adhesive is a cyanoacrylate glue.

37. The method of claim 32 wherein each said planar layer of wires and fibers of said layered arrangement are attached to said mandrel.

38. The method of claim 32 wherein each said wire has a cross-sectional shape having recesses therein for receiving adjacent fibers.

39. The method of claim 38 wherein said recesses have one of an angled shape or a curved shape.

40. The method of claim 39 wherein said curved shape recesses are sized to correspond to a curved shape of said fibers.

41. A preform containing wires and fibers for manufacturing a composite material, said preform comprising:

a) a mandrel;

b) a first planar layer comprised of wires in a side-by-side relationship without any intervening fibers, one end of the first planar layer attached to said mandrel;

c) a second planar layer comprised of fibers in a side-by-side relationship without any intervening wires, one end of the second planar layer attached to said mandrel;

d) wherein said first planar layer of wires and said second planar layer of fibers are arranged on said mandrel adjacently stacked upon one another so that lower portions of said second planar layer of fibers are nested between upper portions of said underlying first planar layer of wires, and axes of said wires and fibers being wound substantially perpendicular to a surface of said mandrel.

42. The wire fiber preform of claim 41 wherein said fibers are silicon carbide and said wires are titanium or a titanium alloy.

43. The wire fiber preform of claim 41 wherein said stacked relationship comprises multiple adjacent layers of fibers and wires, wherein lower portions of layers of fibers/wires are nested between upper portions of underlying layers of wires/fibers.

44. The wire fiber preform of claim 41 wherein each said wire has a cross-sectional shape having recesses for receiving adjacent fibers.

45. The wire fiber preform of claim 44 wherein said recesses have one of an angled shape or a curved shape.

46. The wire fiber preform of claim 45 wherein said curved shape recesses are sized to correspond to a curved shape of said fibers.

* * * * *